United States Patent
Fleureau et al.

(10) Patent No.: US 10,249,341 B2
(45) Date of Patent: Apr. 2, 2019

(54) METHOD, APPARATUS AND SYSTEM FOR SYNCHRONIZING AUDIOVISUAL CONTENT WITH INERTIAL MEASUREMENTS

(71) Applicant: INTERDIGITAL CE PATENT HOLDINGS, Paris (FR)

(72) Inventors: Julien Fleureau, Rennes (FR); Fabien Danieau, Rennes (FR); Khanh-Duy Le, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/548,450

(22) PCT Filed: Feb. 2, 2016

(86) PCT No.: PCT/EP2016/052158
§ 371 (c)(1),
(2) Date: Aug. 3, 2017

(87) PCT Pub. No.: WO2016/124580
PCT Pub. Date: Aug. 11, 2016

(65) Prior Publication Data
US 2018/0019004 A1  Jan. 18, 2018

(30) Foreign Application Priority Data
Feb. 3, 2015 (EP) .................................. 15305159

(51) Int. Cl.
*H04N 5/932* (2006.01)
*H04N 5/935* (2006.01)
(Continued)

(52) U.S. Cl.
CPC ........ *G11B 27/10* (2013.01); *G11B 20/10527* (2013.01); *G11B 27/031* (2013.01); *G11B 27/28* (2013.01); *G11B 2020/10546* (2013.01)

(58) Field of Classification Search
USPC ......................... 386/227, 201, 207, 239, 278
See application file for complete search history.

(56) References Cited

U.S. PATENT DOCUMENTS
2016/0055883 A1* 2/2016 Soll ...................... G11B 27/031
386/285

FOREIGN PATENT DOCUMENTS
EP          2759908        7/2014
WO     WO2013041152       3/2013

OTHER PUBLICATIONS

Bannach et al., "Automatic Event-Based Synchronization of Multimodal Data Streams from Wearable and Ambient Sensors", 4th European Conference on Smart Sensing and Context, Guildford, United Kingdom, Sep. 16, 2009, pp. 135-148.

(Continued)

Primary Examiner — Daquan Zhao
(74) Attorney, Agent, or Firm — Jeffrey M. Navon (57) ABSTRACT

A method, apparatus and system for synchronizing audiovisual content with inertial outputs for content reproduced on a mobile content device include, in response to a vibration of the mobile content device, receiving a recorded audio signal and a corresponding recorded inertial signal generated by the vibration. The recorded signals are each processed to determine a timestamp for a corresponding peak in each of the recorded signals. A time distance between the timestamp of the recorded audio signal and the timestamp of the recorded inertial signal is determine and inertial signals for content reproduced on the mobile content device are shifted by an amount of time equal to the determined time distance between the timestamp of the recorded audio signal and the timestamp of the recorded inertial signal.

22 Claims, 5 Drawing Sheets

Device vibrating

Result signals (51) Int. Cl.
*G11B 27/10* (2006.01)
*G11B 27/031* (2006.01)
*G11B 27/28* (2006.01)
*G11B 20/10* (2006.01)
*H04N 9/80* (2006.01)
*G11B 27/00* (2006.01)

(56) References Cited

OTHER PUBLICATIONS

Danieau et al., "Framework for Enhancing Video Viewing Experience with Haptic Effects of Motion", IEEE Haptics Symposium, Vancouver, British Columbia, Canada, Mar. 4, 2012, pp. 541-546.

Schoonderwaldt et al., "Combining Accelerometer and Video Camera: Reconstruction of Bow Velocity Profiles", 2006 International conference on New Interfaces for Musical Expression, Paris, France, Jun. 4, 2006, pp. 200-203.

Areekath et al., "Sensor Assisted Motion Estimation", 2013 Students Conference on Engineering and Systems, Allahabad, India, Apr. 12, 2013, pp. 1-6.

Anonymous, "Media Recorder", http://developer.android.com/reference/android/media/MediaRecorder.html, Aug. 14, 2014, pp. 1-16.

\* cited by examiner

METHOD, APPARATUS AND SYSTEM FOR SYNCHRONIZING AUDIOVISUAL CONTENT WITH INERTIAL MEASUREMENTS

This application claims the benefit, under 35 U.S.C. § 365 of International Application PCT/EP2016/052158, filed Feb. 2, 2016, which was published in accordance with PCT Article 21(3) on Aug. 11, 2016, in English, and which claims the benefit of European Patent Application No. 15305159.4 filed Feb. 3, 2015.

TECHNICAL FIELD

The present principles relate to media consumption and interaction. More particularly, the present principles relate to a method, apparatus and system for synchronizing audiovisual content with inertial measurements.

BACKGROUND

In the recent years, there has been an explosion of mobile device technologies in the market place. Due to the needs of users which grow exponentially and ambitiously every day, researchers and manufacturers have worked to enhance the interaction between the users and their mobile devices. Many studies have been conducted to improve user's visual perception through imaging techniques and 3D technologies. Researchers have also integrated auditory developments into mobile applications to provide better experience to the users. However, these improvements are still limited to two senses, sight and hearing, while researches in virtual reality have shown that haptic perception seems to lead to a strong connection between devices and user's immersion feelings. Unfortunately, the process of producing haptic data on mobile devices is not well understood. Because on mobile devices, the audiovisual and sensorial media are created simultaneously but in independent processes, a problem of synchronization arises that needs to be solved.

More particularly, issues arise concerning the starting delay in recording media on mobile devices. Specifically, each recording component does not start working immediately when it is launched but only does so after a random delay. It is also currently not possible to access an absolute timestamp (common to both recording processes) of the current recorded frames, and the actual latency between the launching point and the time when haptic and audiovisual content begin to be recorded typically varies from 100 to 600 milliseconds depending on the device. Because of this unpredictable behavior, it is currently not feasible to schedule a launch of the sensors and the media recording device so the recorded data has the same starting point. Such a random latency becomes large enough big enough to create an unrealistic and uncomfortable user experience for the final rendering in a case which makes use of both streams at the same time.

SUMMARY

The present principles propose a method, apparatus and system for synchronizing audiovisual content with inertial measurements.

In one embodiment of the present principles a method includes, in response to a vibration of the mobile content device, receiving a recorded audio signal and a corresponding recorded inertial signal generated by said vibration, processing the recorded audio signal to determine a timestamp for a corresponding peak in that signal, processing the recorded inertial signal to determine a timestamp, for a corresponding peak in that signal, determining a time distance between the timestamp of the recorded audio signal and the timestamp of the recorded inertial signal and shifting inertial signals for content reproduced on the mobile content device by an amount of time equal to the determined time distance between the timestamp of the recorded audio signal and the timestamp of the recorded inertial signal.

In an alternate embodiment of the present principles, an apparatus for synchronizing audiovisual content with inertial measurements on a mobile content device includes a memory for storing at least one of program routines, audio signal data and inertial signal data and a processor for executing said program routines. In such embodiments the processor is configured to, in response to a vibration of the mobile content device, receive a recorded audio signal and a corresponding recorded inertial signal generated by the vibration, process the recorded audio signal to determine a timestamp for a corresponding peak in that signal, process the recorded inertial signal to determine a timestamp for a corresponding peak in that signal, determine a time distance between the timestamp of the recorded audio signal and the timestamp of the recorded inertial signal and shift inertial signals for content reproduced on the mobile content device by an amount of time equal to the determined time distance between the timestamp of the recorded audio signal and the timestamp of the recorded inertial signal.

In an alternate embodiment of the present principles, a system for synchronizing audiovisual content with inertial measurements on a mobile content device includes a vibrator configured to vibrate the mobile content device, an audio recorder configured to record an audio signal in response to a vibration of the mobile content device, an inertial signal recorder configured to record a corresponding inertial signal in response to the vibration of the mobile content device and an apparatus comprising a memory for storing at least one of program routines, audio signal data and inertial signal data and a processor for executing the program routines. In such embodiments, the apparatus is configured to in response to a vibration of the mobile content device, receive a recorded audio signal and a corresponding recorded inertial signal generated by the vibration, process the recorded audio signal to determine a timestamp for a corresponding peak in that signal, process the recorded inertial signal to determine a timestamp for a corresponding peak in that signal, determine a time distance between the timestamp of the recorded audio signal and the timestamp of the recorded inertial signal and shift inertial signals for content reproduced on the mobile content device by an amount of time equal to the determined time distance between the timestamp of the recorded audio signal and the timestamp of the recorded inertial signal.

BRIEF DESCRIPTION OF THE DRAWINGS

The teachings of the present principles can be readily understood by considering the following detailed description in conjunction with the accompanying drawings, in which.

It should be understood that the drawing(s) are for purposes of illustrating the concepts of the various described principles and are not necessarily the only possible configuration for illustrating the principles.

To facilitate understanding, identical reference numerals have been used, where possible, to designate identical elements that are common to the figures.

DETAILED DESCRIPTION

Embodiments of the present principles advantageously provide a method, apparatus and system for synchronizing audiovisual content with inertial measurements. Although the present principles will be described primarily within the context of specific mobile devices such as mobile phones, the specific embodiments of the present principles should not be treated as limiting the scope of the invention. It will be appreciated by those skilled in the art and informed by the teachings of the present principles that the concepts of the present principles can be advantageously applied to the synchronization of audiovisual content with inertial measurements for many other content consumption devices such as mobile phones, tablets, computers, displays and the like.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

Furthermore, because some of the constituent system components and methods depicted in the accompanying drawings can be implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Embodiments of the present principles provide a method, apparatus and system for synchronizing audiovisual content with inertial measurements. In accordance with the present principles, the automatic (or semi-automatic) synchronization of audiovisual content and inertial data obtained from distinct sensors, in one embodiment embedded in a same mobile device, is provided.

Figure 1:
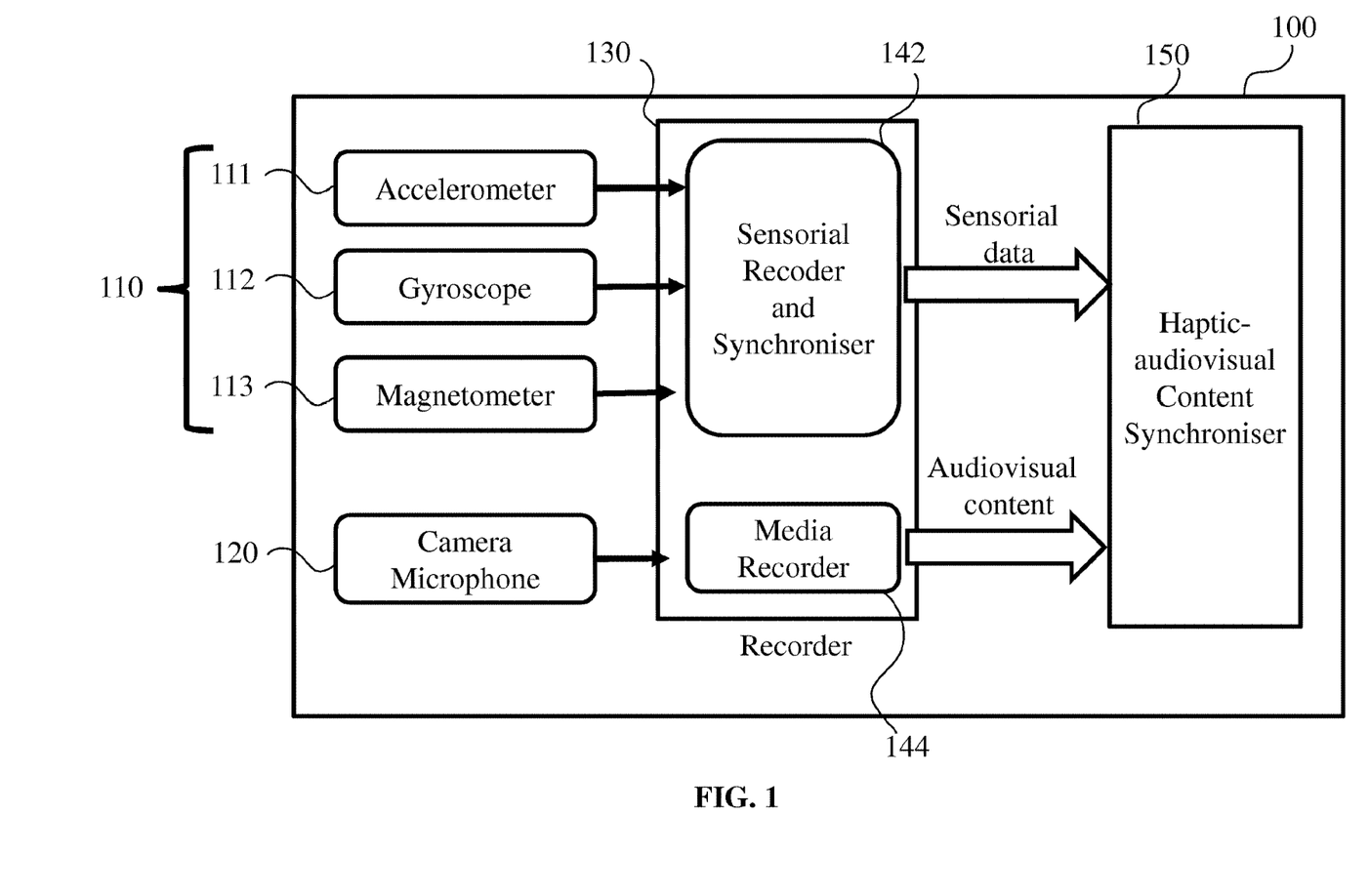
FIG. 1 depicts a high level block diagram of a system for synchronizing audiovisual content with inertial measurements in accordance with an embodiment of the present principles.

FIG. 1 depicts a high level block diagram of a system for synchronizing audiovisual content with inertial measurements in accordance with an embodiment of the present principles. The system of FIG. 1 illustratively comprises a mobile content device 100 (illustratively a tablet) in accordance with an embodiment of the present principles. The mobile content device 100 comprises an accelerometer 111, a gyroscope 112 and a magnetometer 113, collectively inertial sensors 110. The mobile content device 100 further includes a camera phone 120, a recorder 130 and a haptic audiovisual content synchronizer 150. The recorder 130 of the mobile content device 100 of FIG. 1 illustratively comprises a sensorial recorder 142 and a media recorder 144. Although in the embodiment of the present principles of FIG. 1, the mobile content device 100 comprises an accelerometer 111, a gyroscope 112 and a magnetometer 113, in alternate embodiments of the present principles the mobile content device 100 can include other sensors for detecting motion.

Figure 2:
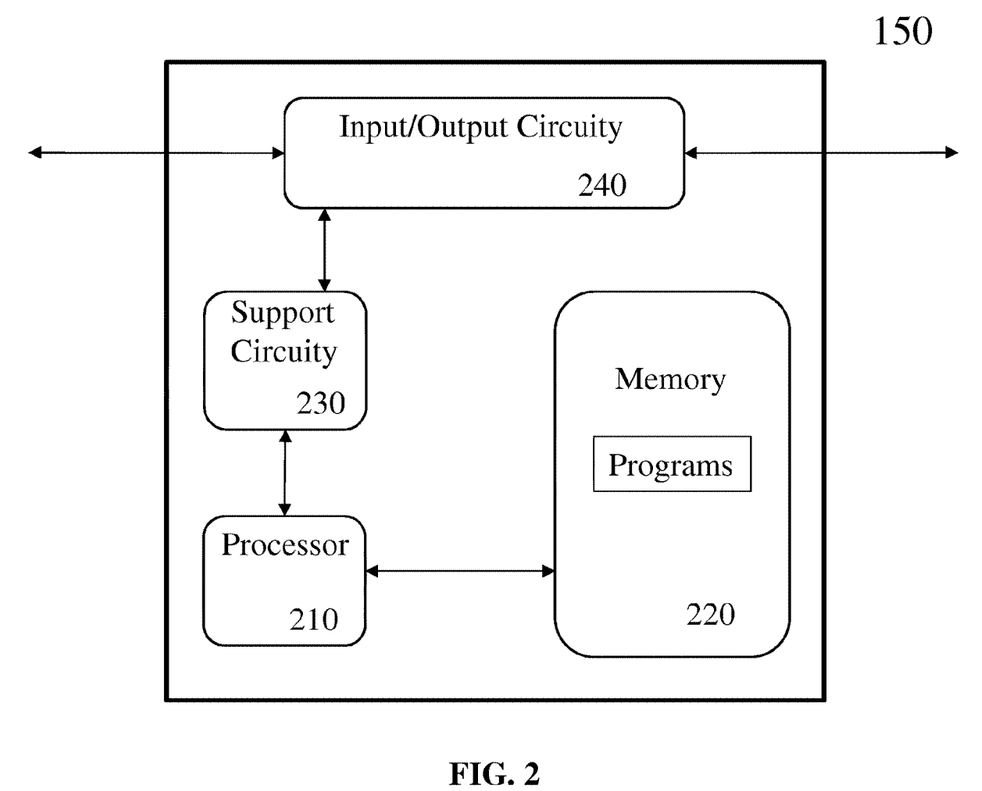
FIG. 2 depicts a high level block diagram of a haptic audiovisual content synchronizer capable of being implemented in the system of FIG. 1 for synchronizing audiovisual content with inertial measurements in accordance with an embodiment of the present principles.

FIG. 2 depicts a high level block diagram of a haptic audiovisual content synchronizer 150 in accordance with an embodiment of the present principles. In the embodiment of FIG. 2, the haptic audiovisual content synchronizer 150 illustratively comprises a processor 210 as well as a memory 220 for storing control programs/software routines, haptic information and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes can be implemented within hardware, for example, as circuitry that cooperates with the processor 210 to perform various steps. The haptic audiovisual content synchronizer 150 also contains input-output circuitry 240 that forms an interface between various functional elements communicating with the processing apparatus.

Although the haptic audiovisual content synchronizer 150 of FIG. 2 is depicted as a general purpose computer that is programmed to perform various control functions in accordance with the present principles, the invention can be implemented in hardware, for example, as an application specified integrated circuit (ASIC). As such, the process steps described herein are intended to be broadly interpreted as being equivalently performed by software executed by a processor, hardware, or a combination thereof. In addition, although the haptic audiovisual content synchronizer 150 of FIG. 2 is depicted as an integrated component of the mobile content device 100, the functionalities of the haptic audiovisual content synchronizer 150 in accordance with the concepts and embodiments of the present principles described herein can take the form of an external component.

Referring back to the system 100 of FIG. 1, the media recorder 144 captures video and audio data from the camera and microphone. In one embodiment of the present principles the media recorder 144 uses a MediaRecorder object (e.g., Google API) to capture video and audio coming from the camera and microphone, respectively. The sensorial recorder 142 receives data from the sensors 110. In one embodiment of the present principles each sensor has a sensor listener which listens to the change of the sensor's data and triggers a callback function to retrieve the data. That is, in one embodiment of the present principles a sensor listener includes a function which is automatically called by the system to notify an event. For example, in one embodiment, a sensor listener is associated with the accelerometer and is used to retrieve data. Such data can include motion data and a corresponding timestamp. The data is then recorded by the sensorial recorder 142.

In accordance with embodiments of the present principles, a logging service of the mobile content device, for example in one embodiment in the haptic audiovisual content synchronizer 150, is running in the background and listens to the packages of data sent by the sensors. In one embodiment of the present principles, when the haptic audiovisual content synchronizer 150 senses data being sent by the inertial sensors, the haptic audiovisual content synchronizer 150 causes the recording of such data to be recorded by the sensorial recorder 142. Whenever a package is received and recorded, the recording of the signal from the sensor which sent that package is checked to determine a timestamp for a corresponding peak in that signal, typically by determining the position of the peak and the time when it occurred. In one embodiment of the present principles, the logging service is scheduled to write the received data in a file after each interval and then empty the container before receiving new data. This scheduled writing enables the system 100 to avoid high memory consumption.

In one embodiment of the present principles, the output of the sensorial recorder 142 are files which are then processed by the haptic audiovisual content synchronizer 150. In accordance with the present principles, to align the audiovisual content from the media recorder 144 and the motion data from the sensorial recorder 142, an easy-to-detect pattern is created in the signals. In one embodiment of the present principles a natural tactile interaction of a user with the mobile content device 100 is taken advantage of. More specifically, when a user touches the mobile content device 100 to begin a recording process (i.e., when a user presses a start recording button on the mobile content device) a marker is created. That is, in one embodiment of the present principles, the camera begins recording and the inertial sensors are started when the application is launched, and the concrete recording is started when the user taps on the "Start Recording" button. This seamless and natural tactile interaction of a user with the mobile content device 100 is perceivable in the audio track as well as, in one embodiment, in the acceleration signal and enables the creation of an easy-to-detect pattern to be used for synchronization. It should be noted that although the following description of the present principles will be described in relation to an acceleration signal, in alternate embodiments of the present principles, other motion signals, such as a signal from the gyroscope 112, magnetometer 113 or any other motion sensor can be implemented as described below with respect to the acceleration signal.

Figure 3:
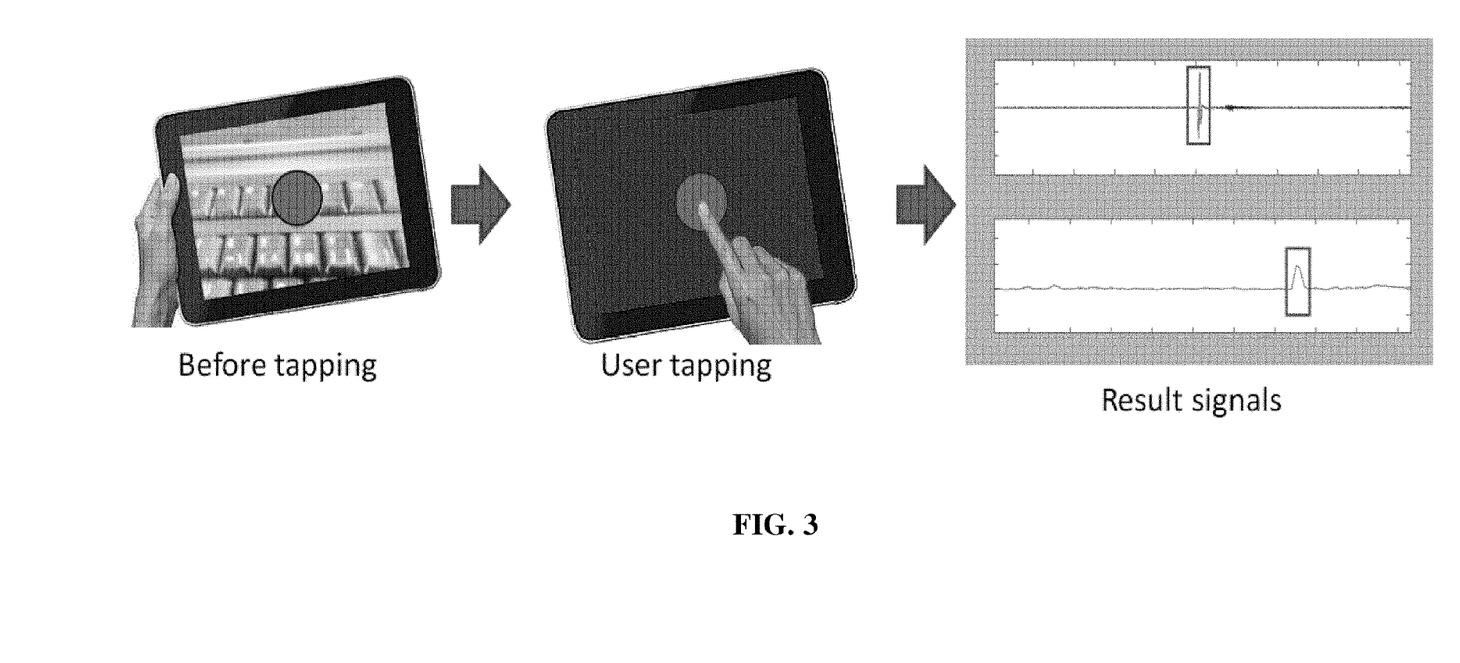
FIG. 3 depicts a pictorial workflow and resulting signals of a sequence for marking a user interaction with a mobile content device using an audio signal and an acceleration signal for use in synchronizing audiovisual content with inertial measurements in accordance with an embodiment of the present principles.

FIG. 3 depicts a pictorial workflow and resulting signals of the above described sequence for marking a user interaction with a mobile content device using an audio signal and an acceleration signal for use in synchronizing audiovisual content with inertial measurements in accordance with an embodiment of the present principles. As depicted in FIG. 3, an application in accordance with the present principles instructs a user to tap a screen of the mobile content device 100 to begin the application. As depicted in FIG. 3, the user taps the screen of the mobile content device 100 to begin the application and a resulting audio signal and respective accelerometer signal is recorded.

Figure 4:
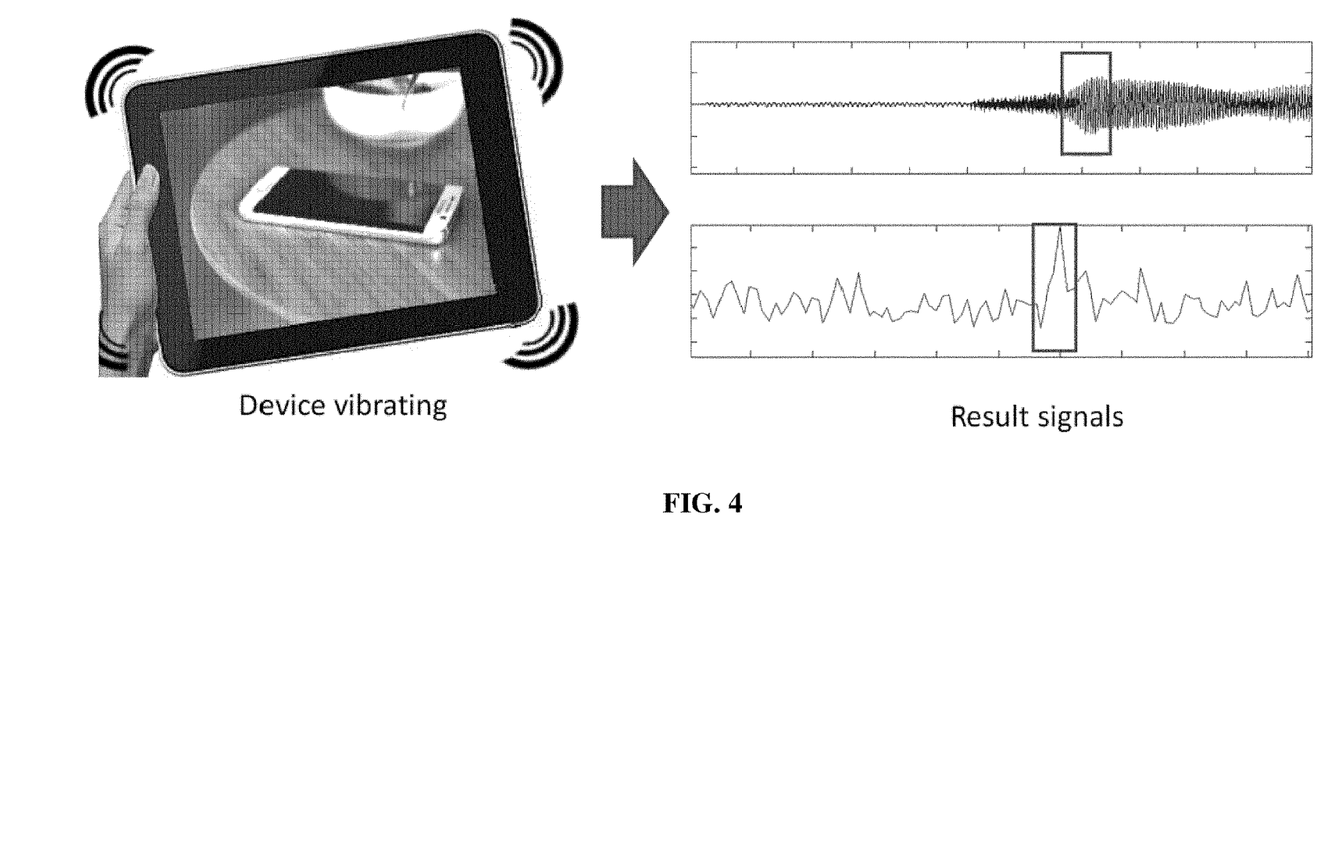
FIG. 4 depicts a pictorial workflow and resulting signals of an alternate sequence for marking a user interaction with the mobile content device using an audio signal and an acceleration signal for use in synchronizing audiovisual content with inertial measurements in accordance with an alternate embodiment of the present principles.

FIG. 4 depicts a pictorial workflow and resulting signals of an alternate sequence for marking a user interaction with the mobile content device using an audio signal and an acceleration signal for use in synchronizing audiovisual content with inertial measurements in accordance with an alternate embodiment of the present principles. In the embodiment of FIG. 4, a built-in vibrator embedded in the mobile content device 100 is activated just before an effective recording (i.e., just before the camera and inertial sensor being launched). In the embodiment of FIG. 4, an application of the present principles instructs the mobile content device 100 to begin the vibrating and a resulting audio signal and respective accelerometer signal is recorded as depicted in FIG. 4.

In both of the above described embodiments of the present principles, markers are obtained to be used in a synchronization procedure of the present principles. After the recording of the audio signal and the accelerometer signal, the synchronization procedure of the present principles can be initiated. In one embodiment of the present principles, the recorded audio stream of the media content is extracted and processed to find the peak and its corresponding timestamp created by the marking procedure described above. Similarly, the corresponding peak and its corresponding timestamp in the accelerations is also obtained by simple signal processing techniques (i.e., peak detection with robust thresholding).

Having obtained the information regarding the two peaks, a haptic audiovisual content synchronizer of the present principles, such as the haptic audiovisual content synchronizer 150 of FIG. 1, computes the gap between the two timestamps and shifts the accelerations to align with the audiovisual content to synchronize the audiovisual content with the inertial measurements. For instance if a peak is detected in the audio signal at 1 sec and in the acceleration signal at 2 sec, then the timestamps of the acceleration signal are shifted by −1 sec. to synchronize the acceleration signal with the audio signal. As such, all such inertial outputs for reproduced content can be shifted by a similar amount of time to synchronize audiovisual content with inertial outputs for content reproduced on the mobile content device. In alternate embodiments of the present principles, the audio signal can be shifted to be synchronized with the inertial signals instead.

Figure 5:
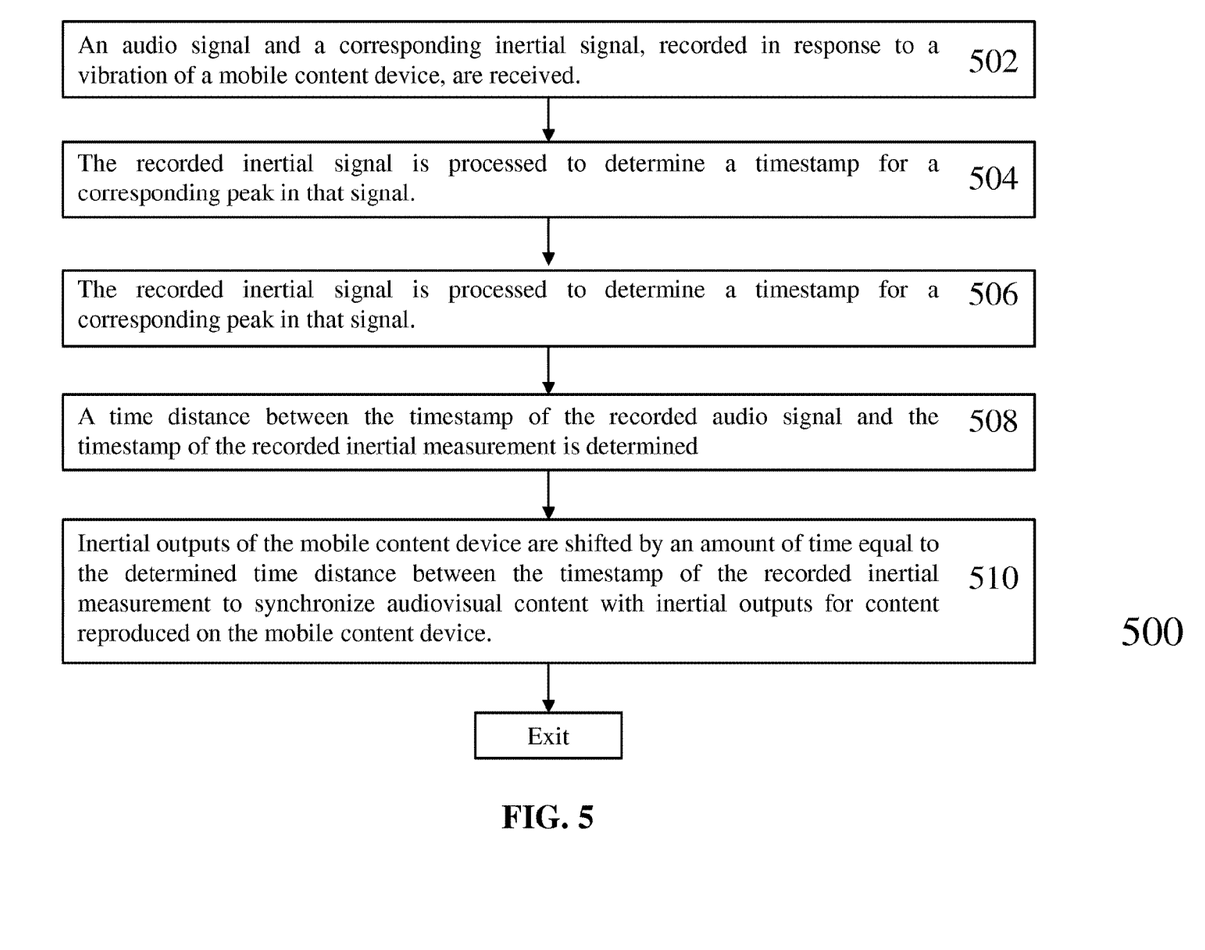
FIG. 5 depicts a flow diagram for a method 500 for synchronizing audiovisual content with inertial measurements in accordance with an embodiment of the present principles.

FIG. 5 depicts a flow diagram for a method 500 for synchronizing audiovisual content with inertial measurements in accordance with an embodiment of the present principles. The method 500 begins at step 502 during which an audio signal and a corresponding inertial signal recorded in response to a vibration of a mobile content device are received at, for example, the haptic audiovisual content synchronizer 150. The method 500 can then proceed to 504.

At step 504, the recorded audio signal is processed to determine a timestamp for a corresponding peak in that signal, typically by determining the position of the peak and the time when it occurred. The method 500 can then proceed to step 506.

At step 506, the recorded inertial measurement is processed to determine a timestamp for a corresponding peak in that signal. The method 500 can then proceed to step 506. The method 500 can then proceed to step 508.

At step 508, a time distance between the timestamp of the recorded audio signal and the timestamp of the recorded inertial measurement is determined. The method 500 can then proceed to step 510.

At step 510, inertial outputs of the mobile content device are shifted by an amount of time equal to the determined time distance between the timestamp of the recorded audio signal and the timestamp of the recorded inertial measurement to synchronize audiovisual content with inertial outputs for content reproduced on the mobile content device. The method 500 can then be exited.

The present description illustrates embodiments of the present principles. It will thus be appreciated that those skilled in the art will be able to devise various arrangements that, although not explicitly described or shown herein, embody the present principles and are included within its scope. That is, having described various embodiments for a method and apparatus for synchronizing audiovisual content with inertial outputs for content reproduced on a mobile content device (which are intended to be illustrative and not limiting), it is noted that modifications and variations can be made by persons skilled in the art in light of the above teachings. It is therefore to be understood that changes can be made in the particular embodiments of the present principles disclosed which are within the scope of the invention. While the forgoing is directed to various embodiments of the present principles, other and further embodiments of the present principles may be devised without departing from the basic scope thereof.

The invention claimed is:

1. A method for synchronizing audiovisual content with inertial measurements associated with timestamps on a mobile device recording the audiovisual content, said audiovisual content comprising a synchronized audio track, comprising:

in response to a vibration of the mobile device, recording an audio signal within the audio track and an inertial signal within the inertial measurements, both being generated by said vibration;

processing the recorded audio signal to determine a first timestamp for a peak in the audio signal;

processing the recorded inertial signal to determine a second timestamp for a peak in the inertial signal;

determining a time distance between the first timestamp and the second timestamp; and adjusting timestamps of the inertial signal by said time distance causing the synchronization of audiovisual content with inertial measurements.

2. The method of claim 1, wherein said vibration of the mobile is caused by built-in vibrator of the mobile device.

3. The method of claim 1, wherein said inertial signal comprises an acceleration signal.

4. The method of claim 1, wherein said inertial signal comprises a signal from a gyroscope.

5. The method of claim 1, wherein said inertial signal comprises a signal from a magnetometer.

6. The method of claim 1, wherein the inertial signal is recorded in a file and the file is emptied before a new inertial signal is received.

7. The method of claim 1, wherein said vibration is caused by a user touching the mobile device to begin a recording process.

8. An apparatus for synchronizing audiovisual content with inertial measurements associated with timestamps on a mobile device recording the audiovisual content, said audiovisual content comprising a synchronized audio track, comprising a memory associated with a processor configured to:

in response to a vibration of the mobile device, record an audio signal and a corresponding inertial signal generated by said vibration;

process the recorded audio signal to determine a first timestamp for a peak in the audio signal;

process the recorded inertial signal to determine a second timestamp for a peak in the inertial signal;

determine a time distance between the first timestamp and the second timestamp; and adjust timestamps of the inertial signal by said time distance causing the synchronization of audiovisual content with inertial measurements.

9. The apparatus of claim 8, wherein said processor is further configured to cause the mobile device to vibrate.

10. The apparatus of claim 8, wherein said inertial signal comprises an acceleration signal.

11. The apparatus of claim 8, wherein said inertial signal comprises a signal from a gyroscope.

12. The apparatus of claim 8, wherein said inertial signal comprises a signal from a magnetometer.

13. The apparatus of claim 8, wherein the inertial signal is recorded in a file and the file is emptied before a new inertial signal is received.

14. The apparatus of claim 8, wherein said vibration is caused by a user touching the mobile content device to begin a recording process.

15. A system for synchronizing audiovisual content with inertial measurements associated with timestamps on a mobile device recording the audiovisual content, said audiovisual content comprising a synchronized audio track, comprising:

a vibrator configured to vibrate the mobile device;

an audio recorder configured to record an audio signal in response to a vibration of the mobile device;

an inertial signal recorder configured to record a corresponding inertial signal in response to the vibration of the mobile device; and an apparatus comprising a memory for storing at least one of program routines, audio signal data and inertial signal data and a processor for executing said program routines;

the apparatus configured to:
- in response to a vibration of the mobile device, record an audio signal within the audio track from said audio recorder and a corresponding inertial signal from said inertial signal recorder;
- process the recorded audio signal to determine a first timestamp for a peak in the audio signal;
- process the recorded inertial signal to determine a second timestamp for a peak in the inertial signal;
- determine a time distance between the first timestamp and the second timestamp; and
- adjust timestamps of the inertial signal by said time distance causing the synchronization of audiovisual content with inertial measurements.

16. The system of claim 15, wherein said system comprises at least one of a group comprising of a tablet, a mobile phone, a computer and a display device.

17. The system of claim 15, wherein said vibrator comprises a built-in vibrator embedded in the mobile device and is automatically activated just before the recording of said audio signal and the recording of said corresponding inertial signal.

18. The system of claim 15, wherein said processor is further configured to cause the mobile device to vibrate using said vibrator.

19. The system of claim 15, wherein said inertial signal comprises an acceleration signal.

20. The system of claim 15, wherein said inertial signal comprises a signal from a gyroscope.

21. The system of claim 15, wherein said inertial signal comprises a signal from a magnetometer.

22. The system of claim 15, wherein said vibration is caused by a user touching the mobile device to begin a recording process.

* * * * *